(12) United States Patent
Metzler et al.

(10) Patent No.: US 10,535,148 B2
(45) Date of Patent: Jan. 14, 2020

(54) SCANNER VIS

(71) Applicant: HEXAGON TECHNOLOGY CENTER GMBH, Heerbrugg (CH)

(72) Inventors: Bernhard Metzler, Dornbirn (AT); Alexander Velizhev, St.Gallen (CH); Stefan Martin Benjamin Gächter Toya, St.Gallen (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 66 days.

(21) Appl. No.: 15/834,904

(22) Filed: Dec. 7, 2017

(65) Prior Publication Data

US 2018/0158200 A1    Jun. 7, 2018

(30) Foreign Application Priority Data

Dec. 7, 2016 (EP) .................................. 16202711

(51) Int. Cl.
  *G06T 7/33* (2017.01)
  *G06T 7/38* (2017.01)
  (Continued)

(52) U.S. Cl.
  CPC ............ *G06T 7/337* (2017.01); *G01B 11/005* (2013.01); *G01C 15/002* (2013.01); *G06T 7/38* (2017.01);
  (Continued)

(58) Field of Classification Search
  CPC . G06T 7/337; G06T 7/38; G06T 2207/10016; G06T 2207/10028; G01C 15/002; G01B 11/005; H04N 5/23238
  See application file for complete search history.

(56) References Cited

U.S. PATENT DOCUMENTS 4,438,401 A  3/1984 Iwamoto et al.
5,194,812 A  3/1993 Yokoi
(Continued)

FOREIGN PATENT DOCUMENTS

DE  10 2013 110 581 A1  3/2015
EP     2278358 A1  1/2011
(Continued)

OTHER PUBLICATIONS

EP Completion of Search dated Jun. 7, 2017 as received in Application No. 16202711.

*Primary Examiner* — Leon Flores
(74) *Attorney, Agent, or Firm* — Maschoff Brennan (57) ABSTRACT

A method for registering two or more three-dimensional (3D) point clouds. The method includes, with a surveying instrument, obtaining a first 3D point cloud of a first setting at a first position, initiating a first Simultaneous Localisation and Mapping (SLAM) process by capturing first initial image data at the first position with a camera unit comprised by the surveying instrument, wherein the first initial image data and the first 3D point cloud share a first overlap, finalising the first SLAM process at the second position by capturing first final image data with the camera unit, wherein the first final image data are comprised by the first image data, with the surveying instrument, obtaining a second 3D point cloud of a second setting at the second position, and based on the first SLAM process, registering the first 3D point cloud and the second 3D point cloud relative to each other.

14 Claims, 3 Drawing Sheets

(51) Int. Cl.
*G01C 15/00* (2006.01)
*H04N 5/232* (2006.01)
*G01B 11/00* (2006.01)

(52) U.S. Cl.
CPC ............... *H04N 5/23238* (2013.01); *G06T 2207/10016* (2013.01); *G06T 2207/10028* (2013.01)

(56) References Cited

U.S. PATENT DOCUMENTS

| | | |
|---|---|---|
| 2010/0052684 A1 | 3/2010 | Fling et al. |
| 2010/0207633 A1 | 8/2010 | Fling et al. |
| 2013/0002256 A1 | 1/2013 | Branson et al. |
| 2015/0029516 A1* | 1/2015 | Neundorf ............. G01C 15/002 356/614 |
| 2015/0077121 A1 | 3/2015 | Branson |
| 2015/0085301 A1 | 3/2015 | Becker et al. |
| 2015/0160342 A1 | 6/2015 | Zweigle et al. |
| 2015/0309174 A1 | 10/2015 | Giger |

FOREIGN PATENT DOCUMENTS

| | | |
|---|---|---|
| EP | 2 645 133 A1 | 10/2013 |
| EP | 2 998 778 A2 | 3/2016 |
| EP | 3 086 283 A1 | 10/2016 |
| WO | 2008/064851 A2 | 6/2008 |
| WO | 2008/064852 A2 | 6/2008 |
| WO | 2011/104314 A2 | 9/2011 |

* cited by examiner

SCANNER VIS

CROSS-REFERENCE TO RELATED APPLICATIONS

This application claims priority to European Patent Application No. 1602711.4 filed on Dec. 7, 2016. The foregoing patent application are incorporated herein by reference.

FIELD OF INVENTION

The present invention relates generally to a surveying instrument and more particularly to registering two or more three-dimensional (3D) point clouds using a surveying instrument.

BACKGROUND

Laser scanning is used to survey many different settings such as construction sites, historical buildings, industrial facilities or any other applicable setting. Such sceneries (settings) are commonly surveyed with 3D laser scanners with use of the time-of-flight (TOF) measuring method in order to sample a cloud of 3D points within a coordinate system. Additionally, a camera may be associated with a laser scanner and may be configured to capture images associated with the setting being scanned.

An exemplary workflow with a laser scanner comprises scanning an entire object or the interior of a building by acquiring multiple point clouds from different positions. The multiple scans are acquired independently and have to be registered to obtain an overall consistent representation. A registration of the multiple point clouds is done commonly by matching corresponding targets within the scans and thereof computing the registration transformation, or by directly minimizing the distance between the overlapping regions of the scans by an optimisation method, e.g. iterative closest point (ICP) method.

Both matching the corresponding targets on the one hand and minimizing the distance between the overlapping regions on the other hand have their drawbacks. The first method requires the one-to-one correspondence between registration targets, where the targets can be artificial, e.g. special reflective registration markers or spheres; or natural objects like landmarks, edges or corners, which are visible from different scan stations.

Setting up artificial targets is a challenging and time consuming task, because it requires planning of the arrangement and installing of these targets in order to fulfil visibility constraints (at least three markers should be visible from each setup). Using natural object targets simplifies the workflow, because no installation of targets is needed, but still requires planning in order to fulfil visibility constraints. The second method requires substantial and sufficiently structured overlap of the scans to find the global minimum of the registration optimisation. Moreover, to achieve convergence in this iterative process a good initial guess is necessary.

Thus, both methods may require advanced knowledge and experience, are time consuming and often result in more scan acquisitions than actually necessary. In addition, the registration may not be readily available in the field, because it is too time consuming or complex to perform it on the fly, especially if tens or hundreds of point clouds are acquired and registered.

Scanners known from prior art are using sensors such as 2D laser profilers, inertial measurement units (IMU), or digital compasses in order to estimate a rough initial translation and rotation between the setup positions.

However, IMU sensors quickly accumulate a drift which limits the distance between two setups. A digital compass may give wrong results in case of disturbing magnetic fields from electrical equipment. 2D profilers work well only if the displacement is taking place within a plane.

So these sensors have significant limitations in automating the registration of laser scans and often work only under specific conditions.

In EP 2 998 778, a method of combining image data with point clouds is disclosed. In this application, a surveying instrument has internal camera units with which images are recorded during the movement of the instrument between setups. As a result, such process provides an initial "guess" for relative translation and rotation between the setups. Using the "guess" as a starting point, an automatic registration is then processed.

Even though an initial guess is available, the subsequent automatic registration can fail, e.g. if the whole overlapping region between scans is represented by a planar scene. In this case, there is an ambiguity in translation relative to this plane. Another drawback of this approach is that only visual information is used. The information can be processed robustly only up to a certain degree of given limited computational power. Fast rotations or quick scene changes during the movement can break the trajectory reconstruction from the images. Therefore, the handling of the instrument is limited.

EP 3 086 283 proposes a method of combining a laser-based point cloud measured with a surveying instrument, e.g. a terrestrial laser scanner or a total station, with an image-based point cloud resulting from image data captured with an external camera unit in order to fill gaps or to acquire details in higher resolution. This method is limited by a necessary overlap between a laser scan and some images from the external camera unit.

In US 2015/160342, a method of using image data to find correspondences between point clouds is disclosed. A laser scanner is equipped with cameras and images are recorded during the movement of the instrument between setups. Landmarks in the images are matched throughout the sequence and used to find correspondence between the scans. Given these correspondences, the registration can be done automatically. One disadvantage of this method is that it needs a visual correspondence between first and second setup, i.e. a sufficient number of corresponding features have to be seen at both setups. The method also requires smooth handling, because it is based on visual information only.

In DE 10 2013 110 581, a method of using IMU data to measure the displacement between two scan setups is disclosed, where the displacement is used for registering the scans. The drawback of this method is that the displacement is based on inertial measurements, which are affected by drift.

In addition, solutions known from prior art, in particular the ones using visual methods, generally can reconstruct the scale of the trajectory and environment only poorly or not at all. As well, inertial information provides only estimation for scale with a relatively low accuracy.
bucket.

One way to locate underground utilities is to detect electromagnetic fields emitted by the nature of the utility itself. This applies to utilities having a naturally occurring electrical signal, which signal emits an electromagnetic field that is detectable above the ground, such as e.g. a live power supply line, communication cables, etc. As shown e.g. in WO 2011/104314, WO 2008/064851 or WO 2008/064852, the depth or distance to a buried utility can therein be determined according to a difference in signal strength at two or more detectors or pickups, which are located in a known spacing with respect to each other.

To detect a utility without a naturally occurring signal, (for example a wiring system of switched off street lights, unused or low-voltage communication cables, gas- or water-pipes, etc.) an artificial signal can be conducted to the utility. For example, in U.S. Pat. No. 4,438,401 a metallic utility without a naturally occurring signal is directly connected to a signal-generator. In U.S. Pat. No. 5,194,812, a hollow pipe, like a gas or water pipe is detected by introducing a conductor or sonde into it. In EP 9 166 139 or EP 2 645 133, a electrical signal is coupled into a conducting underground structure by introducing a current from an AC current-source into soil by some earth-spikes, resulting in the current to follow preferably along the conductive structure as path of least resistance through soil.

Still, detecting utilities which are not naturally carrying a detectable electrical current is bothersome, requires additional external equipment and can fail in many ways.

BRIEF DESCRIPTION

It is therefore an object of some embodiments of the present invention to provide an improved method and device, in particular allowing for a more precise and robust calculation of the registration of two or more point clouds.

Some embodiments of the present invention proposes the combination of a laser scanner and a camera unit (and particularly an IMU), wherein at least one laser scan is used for initializing an SfM or SLAM point cloud of the environment in order to achieve a very precise scale, in particular for resection, i.e. determination of camera poses along the trajectory, for forward intersection, i.e. determination of 3D points along the trajectory, and for a bundle-adjustment, i.e. global optimisation minimizing the reprojection error in a typical SfM approach. The same initialization can be used in any other SfM or SLAM process being a stochastic filtering or a non-linear optimization approach.

An automatic registration of a plurality of laser scanned 3D point clouds provides an overall consistent representation. It does not, however, guarantee completeness.

Missing parts in the overall point cloud may be covered by taking images with an external camera unit, reconstructing a dense point cloud with the images and registering the point cloud with at least one point cloud captured by the surveying instrument.

Some embodiments of the present invention propose a new solution which overcomes the limitation of necessary overlap between a laser scan and some images from an external camera unit. It is a solution for a registration problem of a point cloud generated from images relative to a point cloud from the surveying instrument. The solution is based on correspondences between images recorded by an internal camera unit during the movement of the instrument between stations, and 3D points captured by the surveying instruments, and in particular also between the aforementioned and images from an external camera unit.

In order to generate a point cloud of an object, the object can be scanned with a laser scanner or a total station. The surveying instrument needs to have direct line-of-sight to the object points to measure. The surveying instrument is set up at different positions, where direct line-of-sight is given, to acquire a point cloud of the entire object. Every new setup of the surveying instrument takes time and reduces the productivity of the user. In order to transform all laser scans to the same coordinate system, a registration procedure is performed.

Some embodiments of the invention address the problem of fully automatic registration. The proposed solution comprises laser scanning from different surveying instrument positions and recording a plurality of images or a video during the movement of the surveying instrument between these positions. The images, in addition to other sensory information, are used to reconstruct the trajectory of the surveying instrument as well as a sparse representation of the environment. This reconstruction may then be used to register the laser scans in a common coordinate system. In addition, the reconstruction in combination with the laser scans may be used within the same optimisation procedure (e.g. bundle adjustment or iterative-closest point) to merge reconstruction and laser scans to a total point cloud. The total point cloud should be consistent with both laser scans and image data which make the registration solution more reliable and accurate.

Preferably, the reconstruction of the trajectory and the environment with means of the sensory information is done during the movement of the surveying instrument and with such accuracy that no or little registration effort is necessary for visualization and annotation of the laser scans in the field or point cloud post-processing in the office. Furthermore, the robustness of the reconstruction enables an almost unrestricted handling of the surveying device, e.g. picking up the surveying device and carrying it upstairs and downstairs in a building, or attaching the surveying instrument to an unmanned vehicle, such as a flying drone or mobile robot, in order to transport it to a different place. Accuracy and robustness are achieved by uniquely combining visual and inertial information in a real-time sensor fusion procedure known as structure-from-motion (SfM) or simultaneous localization and mapping (SLAM).

During laser scanning some parts of the scene that have been planned to be covered may be missed out in the resulting over-all point cloud. In this case, a new instrument setup location is needed from which the missed scene part can be surveyed. Alternatively, additional images may be taken by the internal camera unit or an external camera unit. A new point cloud is computed from captured images and merged together with a point cloud recorded by the surveying instrument or the resulting over-all point cloud.

Generation of a 3D point cloud of missing parts may be done using dense matching techniques, e.g. a semi-global matching (SGM) algorithm. According to the present invention, a novel solution for the registration problem of a point cloud generated from images recorded by camera unit relative to a point cloud from the surveying instrument is suggested. Said point cloud from the surveying instrument, in turn, is based on the correspondences between images recorded by internal cameras during the movement of the instrument from a first to a second setup location, and 3D points recorded by a surveying instrument.

Some embodiments of the invention relates to surveying instruments, like 3D scanners or total stations, which are equipped with a scanning unit, one or more cameras with sufficiently large field-of-view, gyroscopes and a processing unit. Before being moved from a first scan station to a next scanning station, with means of its components, the surveying instrument is acquiring an initial 3D dense point cloud, deriving an initial set of 2D feature locations from images captured by an internal camera unit, deriving an initial 3D sparse point cloud from the initial 3D dense point cloud, and initializing the reconstruction with initial 3D sparse point cloud.

While being moved from the first scan station to the next scan station, with means of its components, the surveying instrument is acquiring a set of images and angular rate data, estimating the angular displacement from angular rate data, extracting and tracking 2D features locations in the image data, and using at least the 2D feature locations and angular displacements in a stochastic filtering (e.g. Kalman filter) or in a non-linear optimisation in order to reconstruct the sparse 3D point cloud and to estimate the pose of the scanner.

When arrived and stopped at the next scan station, with means of its components, the surveying instrument is computing a delta pose from the first to the second scan station, and acquiring a 3D dense point cloud at the second scan station, where the second point cloud shares the same coordinate system as the first point cloud, given the delta pose.

Additionally, the following aspects may further characterize the method:
- predicting 2D feature locations using the estimated angular displacement (e.g. based on gyroscope readings),
- refining 2D feature locations based on local patch optimisation (e.g. as done by Kanade-Lucas-Tomasi (KLT) feature trackers),
- matching 2D feature locations based on local feature descriptors (e.g. using scale-invariant feature transform (SIFT) or speeded up robust features (SURF)),
- a stochastic filtering (e.g. particle filter) or non-linear optimisation (e.g. Levenberg-Marquardt algorithm) considering the uncertainties of the sensor readings,
- considering current and past information within a certain time or space window, wherein information can be 2D feature locations, angular displacements, 3D sparse point cloud, and/or 3D scanner poses and scanner pose velocities,
- keeping the non-linear optimisation bounded by marginalization of certain states in the past, in particular of 2D feature locations,
- including accelerometers (e.g. as integrated in an IMU), where a translational displacement is estimated from the accelerations,
- including a barometer, in particular used to measure height and to be included in a stochastic filtering or the non-linear optimisation, and/or used to adjust height dependent system parameters, e.g. gravity constant,
- including a compass, in particular used to measure heading and to be included in a stochastic filtering or the non-linear optimisation,
- including a GNSS sensor or pseudo GNSS sensor, in particular used to measure position and/or velocity and to be included in a stochastic filtering or the non-linear optimisation, and/or used to adjust position dependent system parameters, e.g. gravity constant, and/or used to geo-reference the point clouds,
- including a tilt sensor, in particular used to calibrate accelerometers, and/or used to measure tilt at the first and the second scan station and to be included in a stochastic filtering or the non-linear optimisation,
- using the estimated delta pose between first and second scan station to visualize the 3D point cloud from the first and the second scan station immediately after acquisition of the second scan,
- for estimating the delta pose, starting from the second scan station backwards for verification or reconstruction refinement,
- deriving additional sparse 3D points from the 2D feature locations and the 3D dense point clouds, and including them in the non-linear optimisation, in particular wherein the 3D dense point cloud is acquired at the second scan station and/or at intermediate scan stations between the first and the second scan station,
- using the estimated delta pose between first and second scan station as initial value for the scan registration,
- using flash lights synchronized with the cameras and optionally triggered whenever images are recorded or other means of illumination, and
- using and event-based camera or dynamic vision sensors, where intensity information or information change is acquired and processed asynchronously per pixel to reduce bandwidth requirements and power consumption while increasing the time and space resolution of the reconstruction.

In particular, the method can be augmented in two ways. One way is to transform the images according to a conformal map projection. Another way is to use intrinsic camera unit parameters, extrinsic camera unit parameters, or angular displacement measurements to predict the position and appearance of feature patches for feature tracking.

If taking into account the lens and perspective distortions of a camera unit, then a conformal projection can be applied to the image such that the feature appearance in a local neighbourhood of a feature point is invariant to certain camera unit rotations, in particular the pitch and yaw rotation. Thus, the appearance of the feature patches is independent of the pitch and yaw rotation at certain instance in time, which improves the feature tracking over time and, therefore, the SLAM or SfM process as well. Furthermore, this angle-preserving transformation can be applied efficiently to the images by computing it on a field-programmable-gate-array (FPGA) or other dedicated hardware for image signal processing.

One particular conformal projection is the Mercator projection. With the conformal projection, the pitch and yaw rotations can be handled. The remaining roll rotation of the camera unit can be resolved using angular displacement measurement using a gyroscope.

In general, robust feature tracking is achieved by precise prediction of the feature positions and appearances between image pairs, where pairs can be temporally or spatially linked. The feature position prediction provides an initial position to the feature tracking. The initial feature position is then refined based on the appearance of the feature patch, a part of the image in the neighbourhood of the feature position. The feature position refinement can be initialized with a prediction of the feature patch appearance.

The feature position prediction can be based, at least, on the angular displacement readings.

The feature appearance prediction is an explicit patch transformation applied before the refinement or an implicit transformation part of the refinement itself. The transformation considers one or more of the following:
1) intrinsic camera parameters, in particular camera lens distortions
2) extrinsic camera parameters, in particular camera perspective distortions
3) camera unit displacement, in particular camera unit translation and rotation The first two can be obtained by camera unit calibration. The latter one by measuring the camera unit translation and rotation based on inertial sensors.

The feature position refinement can be an optimization of the position in function of the patch appearance. Therefore, the above mentioned transformations can be part of the optimization.

Thus, initial feature positions and feature appearances are available during feature tracking, which improves the precision and robustness of feature tracking. Additionally, the angular displacement measurements can be directly considered in the stochastic filtering or a non-linear optimisation framework of the SLAM or SfM process. Such a combination of visual and inertial information results in a very robust system.

Some embodiments of the invention relate to a method for registering two or more three-dimensional 3D) point clouds with the steps:

With a surveying instrument, a first 3D point cloud of a first setting at a first position is obtained. Setting is to be understood as the scene which the surveying instrument is capturing, in particular through laser scanning. The surveying instrument is placed at said first position by a user and while standing at the first position, the surveying instrument carries out a scan to record a point cloud of the setting.

A first image based Simultaneous Localisation and Mapping (SLAM) process is initiated by capturing first initial image data at the first position with a camera unit comprised by the surveying instrument, wherein said camera unit comprises one or more cameras, and wherein the first initial image data and the first 3D point cloud share a first overlap. The first image data may be one or more images. The first image data, i.e. at least one of the one or more images, cover the first setting at least in part (overlap).

Simultaneous Localization and Mapping (SLAM) processes (sometimes also VSLAM—for Visual SLAM, when only based on visual information, or VIS—for Visual-Inertial SLAM, if the visual SLAM process is augmented by inertial information) subsume strategies, wherein images from one or more cameras are used to not only autonomously identify previously unknown features within the images, but also to derive the cameras location based on the images and to generate a 2D or 3D map of the imaged surrounding. To enable a SLAM process, the camera is moved with respect to the imaged environment, which is why Structure-from-Motion (SfM) is also a term used in conjunction.

The first 3D point cloud is spatially linked with the first initial image data based on the first overlap. This may be performed with a computing unit comprised by the surveying instrument, but also mobile computing (e.g. handheld device, tablet, or notebook computer) or cloud computing is an option if the surveying instrument is equipped with according communicative technology. The spatial linkage is to be understood as a referencing, e.g. based on a feature detection and matching of features in the first 3D point cloud and features in the initial image data or based on the known relationship between 3D point cloud coordinate system and the camera unit coordinate system. This relation could be given by a camera to laser scanner unit calibration. This step of spatially linking provides immediate scale to the first SLAM process—in a regular SLAM process, as is generally known, scale is not known a priori, but comes with processing the image data after some movement of the camera origin. Another advantage of this step of spatial linkage of the first 3D point cloud and the first image data of the first SLAM process is the precision of the scale which makes the process very robust and precise from the beginning. A regular SLAM process cannot provide such precision by its own.

During the first SLAM process, the surveying instrument is moved along a first path from the first position to a second position. Whilst moving, first image data of a first SLAM setting are continuously captured, wherein the first image data are a first sequence of image data comprising the first initial image data. The first image data are to be understood as all image data generated for and used by the first SLAM process. The first SLAM setting is to be understood as the scene which is captured with image data during the path from the first position to the second position.

Particularly, whilst moving, a first sequence of poses of the surveying instrument along the first path may continuously be detected and recorded. For this, a user is e.g. carrying the surveying instrument from the first position to the second position or the surveying instrument is moved by a platform such as a mobile robot or aerial vehicle, wherein the platform may be autonomous. Pose is to be understood as describing position and orientation, whereas sequence of poses is to be understood of at least two poses (the first pose at the first position and the final pose at the second position) as outcome of the SLAM process. The sequence of poses, the first and final pose and possible intermediate poses, have no restriction in time or space resolution. The resolution can be continuous or discrete and depends entirely on the applied sensors and algorithms.

When arrived at the second position the surveying instrument is placed at the second position. The first SLAM process is finalised at the second position by capturing first final image data with the camera unit, wherein the first final image data are comprised by the first image data as well.

With the surveying instrument, a second 3D point cloud of a second setting is obtained at the second position. Not necessarily do the first 3D point cloud and the second 3D point cloud share an overlap, i.e. sharing corresponding points. However, the first final image data, i.e. at least one of the one or more images of the first final image data, do cover the second setting at least in part, and thereby constituting the second overlap.

Based on the first SLAM process, the first 3D point cloud and the second 3D point cloud are registered relative to each other. Registering is to be understood as finding a spatial transformation that aligns the two point clouds in a common coordinate system.

In the first SLAM process not only the second position (and orientation) of the surveying instrument is determined, but also positions and orientations of the images taken along the path (trajectory) from the first position to the second position. What results is a set of referenced images being referenced in a common coordinate frame. These images, together with the pose (position and orientation) information, in particular with a sparse point cloud (SLAM point cloud), can be stored in a database and used at a later stage, e.g. for gap-filling purposes based on a scanning device with an external camera or for starting another SLAM process with a camera unit of the surveying instrument somewhere in-between the first position and second position for registering another point cloud acquired at another scanning position.

The method according to some embodiments of the invention may further comprise: merging the first 3D point cloud and the second 3D point cloud to a total point cloud within a single coordinate system.

The method according to the invention may further comprise: Whilst moving, a first SLAM point cloud (SLAM 3D map) is continuously built, the first SLAM point cloud representing the first SLAM setting.

The method according the invention may also comprise: merging the first 3D point cloud, the first SLAM point cloud and the second 3D point cloud to a total point cloud within a single coordinate system.

Optionally, with the corresponding features, the second 3D point cloud is spatially linked with the first final image data based on a second overlap, which second overlap the first final image data and the second 3D point cloud share. Additionally, scale is provided by the highly precise laser scan (second 3D point cloud), this time at the "end" of the first SLAM process, i.e. for the final image data.

In an embodiment of the method according to the invention, registering is performed additionally based on a global optimisation, in particular wherein the global optimisation may be performed one or more times until convergence is reached according to a given criterion. The global optimisation may comprise a bundle-adjustment (BA) that jointly minimises 2D-to-2D distances between 2D reprojections of the first image data, and at least one of: 2D-to-3D distances between 2D reprojections of the first initial image data and 3D points of the first 3D point cloud, and 2D-to-3D distances between 2D reprojections of the first final image data and 3D points of the second 3D point cloud.

Registering may additionally or alternatively be performed based on a global optimisation which particularly comprises an iterative-closest-point (ICP) optimisation that minimises 3D-to-3D distances between 3D points of the first 3D point cloud and the second 3D point cloud.

Registering may additionally or alternatively be performed based on a global optimisation which particularly comprises an iterative-closest-point (ICP) optimisation that minimises 3D-to-3D distances between 3D points of the first SLAM point cloud and at least one of the first 3D point cloud and the second 3D point cloud.

3D-to-3D distances can be computed from any 3D points correspondences, whereas the correspondences can be defined by the closest distance, the normal projection of a point to a plane, the closest distance between lines or any other meaningful geometric relation, but can be established by feature detection and matching as well.

In another embodiment of the method according to the invention, merging is performed according to a global optimisation that jointly minimises at least one of 2D-to-2D distances, 2D-to-3D distances and 3D-3D distances between 3D points and/or 2D reprojections, in particular wherein the global optimisation may be performed one or more times until convergence is reached according to a given criterion.

The first SLAM process may further comprise: during feature tracking, transforming feature appearance based on at least one of: intrinsic camera parameters, in particular camera lens distortions, extrinsic camera parameters, in particular camera perspective distortions, and a camera unit displacement measured by using additional sensory input, in particular inertial data, in particular at least orientation data of the camera unit calculated from the inertial data.

The first SLAM process may further comprise the step: processing the first image data of the first SLAM process such that they are represented in a locally angle-preserving format, in particular by using a conformal projection, in particular by using a Mercator projection.

The method may further comprise: at a third position, which may be equal to the second position or may be a new position particularly along the path (trajectory) from the first position to the second position, initiating a second SLAM process by capturing second initial image data with the camera unit, wherein the second initial image data share a third overlap with the first SLAM setting, wherein the second SLAM process comprises: spatially linking the total point cloud with the second initial image data based on the third overlap, moving the surveying instrument along a second path from the third position to a fourth position, whilst moving, continuously capturing second image data, wherein the second image data are a second sequence of image data comprising the second initial image data, and building a second SLAM point cloud representing a second SLAM setting, thereby detecting and recording a second sequence of poses of the surveying instrument along the second path, finalising the second SLAM process at the fourth position by capturing second final image data with the surveying instrument. With the surveying instrument, a third 3D point cloud of a third setting may be obtained at the fourth position, and based on the second SLAM process, the third 3D point cloud and the total point cloud may then be registered relative to each other. In this way, a further SLAM process may "hook" in to the existing total point cloud in order to fill gaps or extend the total point cloud.

In another embodiment of the method according to the invention, further optional steps are: at a fifth position, capturing third image data with the camera unit or an external camera, wherein the third image data share a fourth overlap with the at least one of the SLAM settings, identifying points of corresponding features in the third image data and one or more of the image data (above referred to as first image data and second image data) of the SLAM processes (accordingly, above referred to as first SLAM process and second SLAM process), and by an image based reconstruction, extending at least one of the SLAM point clouds (above referred to as first SLAM point cloud and second SLAM point cloud) and the total point cloud based on the third image data. For live-processing, the external camera may be configured to intercommunicate with the surveying instrument. For post-processing, the captured data may be read out of the external camera.

Some embodiments of the invention further pertain to a surveying instrument, in particular a laser scanner, having a body mounted on a base, wherein the body is rotatable relative to the base about an azimuth axis and comprises an emitting unit for providing a transmission beam, a receiving unit for detecting a reception beam, a directing unit, in particular a mirror or a prism, rotatable about an elevation axis configured to direct the transmission beam from the emitting unit towards a setting, direct the reception beam from the setting to the beam receiving unit, a camera unit having one or more cameras, in particular having a panoramic camera, a processing unit configured for performing at least in part the steps of a method according to the specification herein.

The surveying instrument may further comprise at least one of an angular rate data measuring device and a linear acceleration measuring device, in particular at least one of an IMU, a gyroscope and an accelerometer. The surveying instrument may also comprise a Global Navigation Satellite System (GNSS) sensor or a Pseudo-GNSS sensor.

Some embodiments of the invention also relates to a Computer Programme Product comprising programme code which is stored on a machine-readable medium, or being embodied by an electromagnetic wave comprising a programme code segment, and having computer-executable instructions for performing the steps of a method described herein, in particular when run on a surveying instrument described herein.

BRIEF SUMMARY OF THE DRAWINGS

In the following, the invention will be described in detail by referring to exemplary embodiments that are accompanied by figures, in which.

DETAILED DESCRIPTION

Trajectory and Environment Reconstruction

Figure 1:
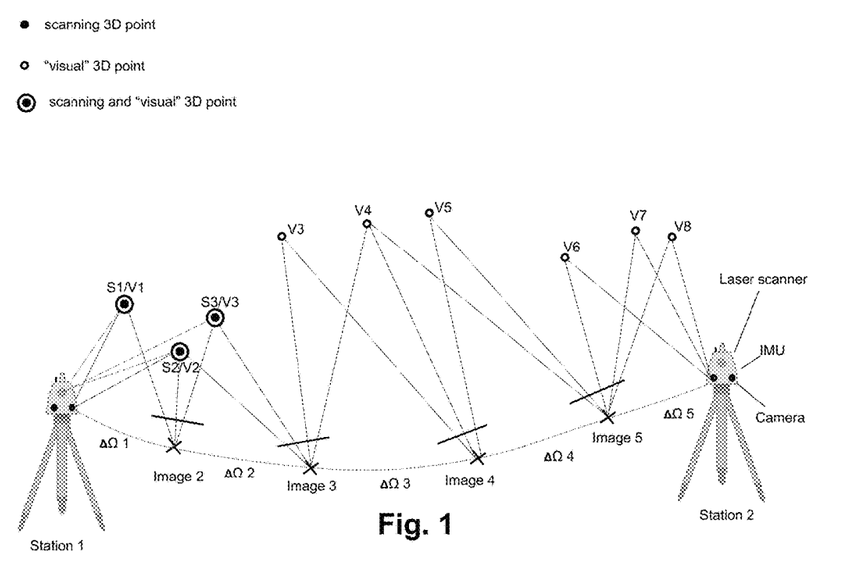
FIG. 1: shows linkage of a SfM- or SLAM-process to a first scan according to an embodiment of the invention.

FIG. 1 shows one embodiment of the method according to the invention. The trajectory of the laser scanner while being transported from station 1 to station 2 is estimated from additional sensor configurations on the laser scanner, such as one or more cameras, gyroscopes and/or accelerometers. The gyroscope measures the angular rate and the accelerometer measures the accelerations of the laser scanner during movement. These sensors are proprioceptive and drift prone. The cameras are exteroceptive sensors, which can reduce drift. The cameras are measuring the angular displacement. These sensor modalities are combined in a stochastic filtering or a non-linear optimisation framework to estimate the pose of the laser scanner and the scene structure at specific time steps during the displacement. The sequence of poses constitutes the laser scanner trajectory, and the consecutive scene structure constitutes the reconstructed environment.

According to the invention, the estimation is initialized based on a laser scan, in particular based on the initial laser scan. The estimation includes current and past sensor modalities, but limited to a certain time or space window. The selection is preferably done in a probabilistic manner.

High accuracy is achieved by at least: combining inertial and visual sensor modalities for pose estimation, initializing the pose estimation using the 3D point cloud at a scan station, and using a stochastic filtering or non-linear optimisation framework, at least partially, to do pose estimation.

Existing methods, which provide some sort of automatic registration, often have the drawback that the movement of the scanner is constrained, e.g. to the floor plane. The current invention allows unconstrained movement, e.g. picking up the laser scanner and carrying upstairs and downstairs within a building, or mounting the laser scanner on an unmanned vehicle, e.g. a flying drone or mobile robot, while still allowing for an accurate estimate of delta pose.

High robustness is achieved by at least:

combining inertial and visual sensor modalities for pose estimation, using gyroscope measurements as predictions in the feature tracking, and using stochastic filtering or a non-linear optimisation framework to do pose estimation.

Figure 2:
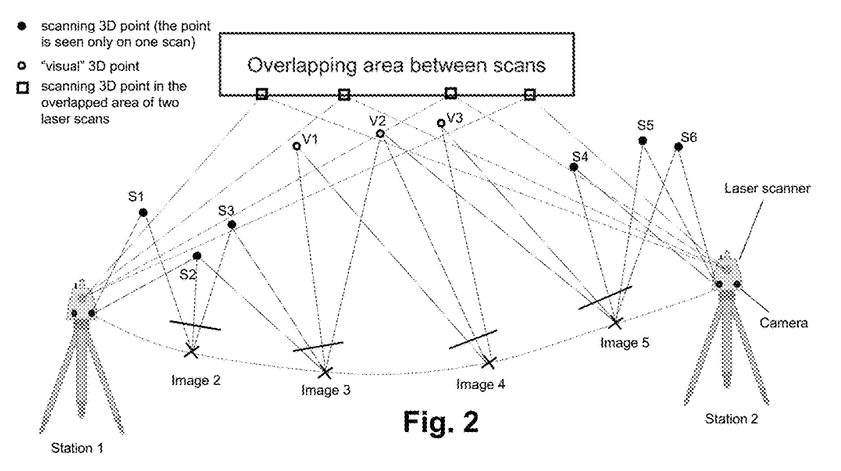
FIG. 2: shows joint registration of surveying data and image data from a SfM- or SLAM-process according to another embodiment of the invention.

Optionally, the invention furthermore makes use of the following aspects:

image transformation for pitch and yaw invariant feature appearance (conformal projection, in particular a Mercator projection) which improves feature tracking, reprojection of 3D object points for feature prediction in tracking which improves robustness, feature hand-over between cameras of a multi-camera system using predictions regarding the feature position based on inertial measurements and/or reconstructed 3D points, brightness adaptation of feature patches in feature tracking which improves robustness, constraint feature patch optimisation in feature tracking by information from SfM or IMU, ray-based resection which improves robustness, recovery of reconstruction using feature matching, feature injection from initial point cloud during pick-up phase, loop closure during reconstruction, detection of movement to start and stop reconstruction, adaptive frame rate to better deal with fast scene changes, using pose prediction for resection, forward intersection and refinement under adverse conditions Joint Registration of Laser Scans and Image Data From an Internal Camera Unit According to a further aspect of the invention, as FIG. 2 illustrates, at least two laser scans (point clouds) and image data are used within the very same optimisation procedure to solve a registration task. In other words, the final registration solution is consistent with all laser scans and the image data. This helps to improve registration reliability and accuracy.

In a first step, a user performs a laser scan at a first station, and then moves the scanner to a second station (images are recorded during this movement) and another scan is performed at the second station. Thereafter, a global optimisation procedure is performed comprising a cost function using the sum of two error types. The first error type is a distance from an image point and a reprojection of a corresponding 3D point in the image space. The second error type is a distance between corresponding points of two scans. As a result of this global optimisation, the positions and orientations for laser scans and all intermediate images are improved.

The images may also be panoramic image or an image set resulting from a multi-view camera.

Figure 3:
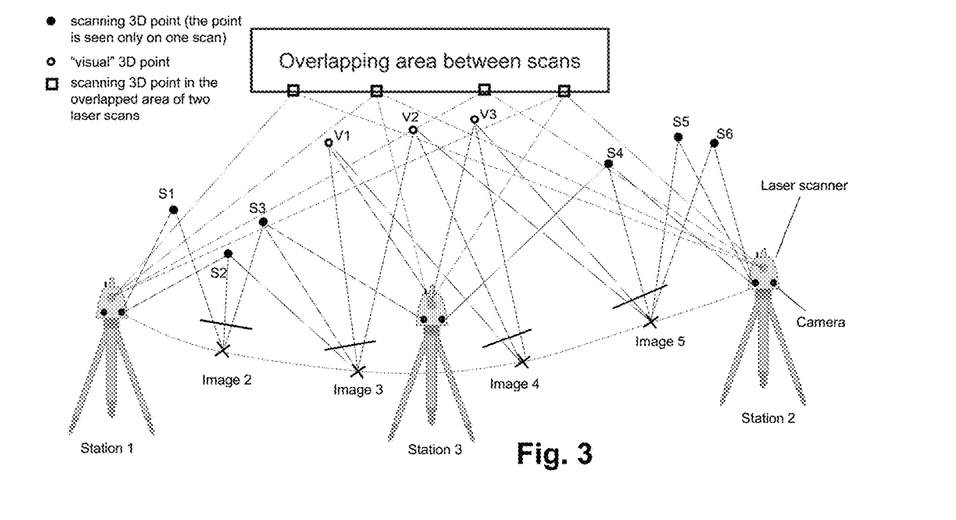
FIG. 3: shows, according to another embodiment of the invention, the joint registration of surveying data and image data from a SfM- or SLAM-process from FIG. 2, with another scan station.

With reference to FIGS. 2 and 3, the following steps are according to the invention:

1) A user performs scanning on the station 1.

2) A user moves the scanner to the scanning station 2, and while moving, video or single images are recorded during this movement. The image data are automatically processed together with point clouds (recorded by the scanner at station 1) within a SfM/SLAM algorithm, either in real-time or at a later time. As a result, an initial guess of rotation and translation relative to station 1 is computed for station 2.

3) After the movement a scanning process from station 2 is performed.

4) At this point the following correspondences or matches between image data and point clouds are available:

4a. 2D-2D match is a pair of points on two different images from the internal camera unit corresponding to the same 3D point in the object space. For each 2D-2D match, a "visual" 3D point is computed using forward intersection of rays defined by 2D image points.

4b. 2D-3D match is represented by an image point from the internal camera unit and a corresponding 3D point from a laser scan on the given scanning station. These matches are identified automatically from images and point clouds recorded at the same scanning station (e.g. for stations 1 and 2). This is possible because images and point clouds from the same station are recorded in the same coordinate frame, therefore 3D laser points could be directly projected onto the images. Matches are identified independently for station 1 and station 2, and no image tracks are required.

4c. 3D-3D match is represented by two 3D points from different scans corresponding to the overlapping area in object space. These matches are computed as neighbouring points between two scans. This procedure requires known positions and orientations of two laser scans. Laser scan 1 is considered as a reference, and for laser scan 2 the initial guess computed in step 2) is used. In addition, pairs of other geometrical primitives (like 3D lines, planes or cylinders) may be extracted from laser scans and may be used as additional correspondences.

5) In a last step, one global optimisation procedure (e.g. bundle adjustment) is performed in an iterative manner. The following errors are minimized together in the same optimisation procedure:

5a. Distances between image points and projections of corresponding "visual" 3D points in the image space (based on 2D-2D matches);

5b. Distances between image points and projections of corresponding 3D points from laser scans and the image space (based on 2D-3D matches). Station 1 is considered a reference station, and therefore all 3D points from this station might be directly used in optimisation. 3D points from the second station are converted to the coordinate frame of the station 1 using position and orientation of station 2 which are available by the current iteration of the optimisation.

5c. Distances between corresponding 3D points or other 3D primitives from overlapped regions of laser scans (based on 3D-3D matches) in 3D space. Similar to the standard ICP algorithm, these correspondences may again be identified after each iteration of the optimisation procedure.

This approach may be considered as a bundle-adjustment with additional constraints from scanner data or, likewise, as an ICP algorithm with additional constraints from image data. The optimisation procedure could be done for individual pairs of stations, or could be extended to the case of multiple scanning stations. In this case, the optimisation procedure includes correspondences from all scanning stations and images. In addition, image sequences recorded by the internal camera unit between different stations (e.g. 1-2 and 2-3) also could be matched between each other and additional matches from these images are included into the optimisation procedure. 3D points and corresponding image points from previous stations (e.g. between stations 1-2) may additionally be used directly in a SfM or SLAM algorithm which is computed during movement between the stations (e.g. for stations 2-3).

After the optimisation procedure is performed, positions and orientations for laser scans and all intermediate images are optimised. Information on the translation and pose change may be stored in a database and used later to register new scans. For example, a new scan (e.g. station 3) may be performed the next day, and a registration of the third scan is then done automatically (FIG. 2). For this purpose, the scanning procedure is performed, then correspondences between images recorded at station 3, and images recorded at the stations 1, 2, and between 1 and 2, are identified using feature matching techniques (e.g. via matching of SIFT descriptors). These correspondences are similar to steps 4a, 4b, 4c, and the step 5 may be performed to compute position and orientation of the laser scan 3. Positions and orientations of the laser scans 1 and 2, as well as positions and orientations of all images recorded during the movement of the surveying instrument between these positions may be considered fixed or non-fixed inside the optimisation.

Registration of Additional Image Data From an External or The Internal Camera Relative to Laser Scans/Image Data From Internal Camera Unit (Gap Filling)

Video or image data recorded during the movement of the scanner between stations may moreover be used to register additional images from an external (high-resolution) camera unit or the internal camera. Registration of such images from an external camera unit allows for directly referencing an image-based 3D point cloud to the point cloud generated by a surveying instrument.

Figure 4:
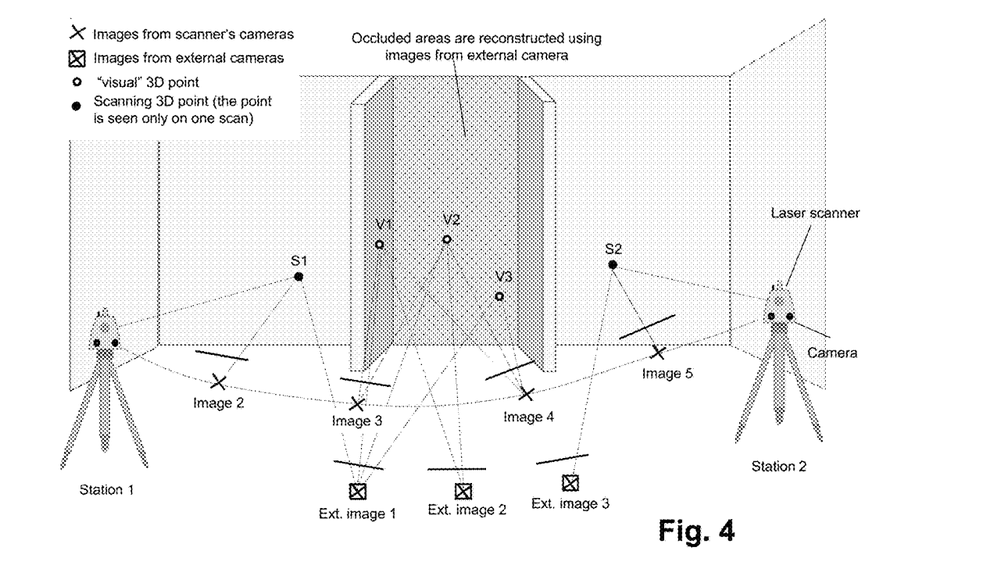
FIG. 4: shows, as another embodiment of the invention, gap filling of the registration process according to the invention by means of extra images captured by external cameras.

With reference to FIG. 4, the following steps illustrate the registration of images from external camera unit relative to laser scans according to the invention:

1) Pairs of 2D-2D feature matches on images from internal and external camera units are identified using feature matching technique (e.g. using Scale-invariant feature transform (SIFT) detector/descriptor).

2) Matches between images from internal camera units acquired during scanning, and images recorded by external camera units are identified using feature matching technique (e.g. using SIFT detector/descriptor). Image points from internal camera units acquired during scanning also have corresponding 3D points measured by a surveying instrument. So these matches are 2D-3D correspondences.

3) A global optimisation procedure (e.g. bundle adjustment) is performed in order to reconstruct poses from external and internal cameras in the same coordinate system. Matches identified during steps 1) and 2) are included to the optimisation.

The optimisation of step 3 has several options:

3-1) Positions and orientations of laser scans and poses of internal cameras may be fixed.

3-2) Only positions and orientations of laser scans are fixed and poses of internal cameras are optimised.

3-3) Only poses of internal cameras are fixed and positions and orientations of laser scans are optimised.

Poses of external cameras are optimised in all cases 3-1) to 3-3). Option 3-1) may be considered a full registration framework extended by image data from the external camera unit.

Figure 5:
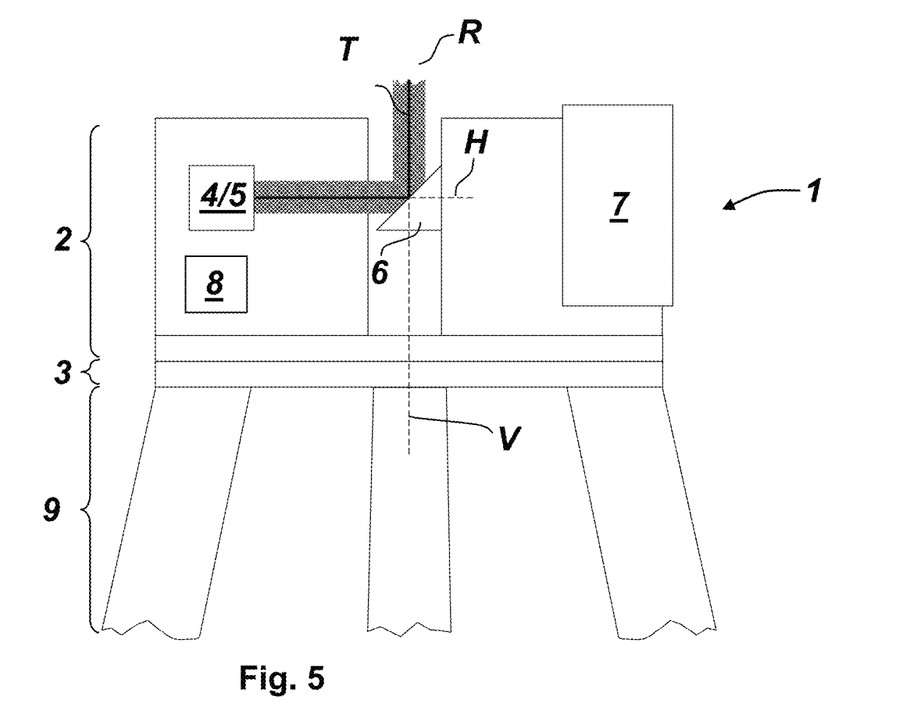
FIG. 5: shows a surveying instrument according to the invention embodied as a laser scanner.

FIG. 5 shows a laser scanner 1 as an exemplary embodiment of a surveying instrument configured to perform a method according to the invention. The scanner comprises a body 2 and a base 3 optionally mounted on a tripod 9. A controlled, motorised relative rotation between body 2 and base 3 is provided around axis V. The body 2 comprises an emitting unit 4, a receiving unit 5, and a directing unit 6, wherein emitting unit 4 and receiving unit 5 are combined as one part in this example. The directing unit 6 is mounted in the body such that it is rotatable around an elevation axis H by a motor (not shown). While spinning, the directing unit 6 is deflecting a transmission beam T coming from the emitting unit 4 towards a setting, and a reception beam R coming from the setting back to the scanner. The camera unit 7 comprises one or more cameras, in particular a panoramic camera or a set of cameras, wherein each camera directs in different directions providing a wide angle view (up to a 360 degree view). The processing unit 8 controls the mentioned components of the surveying instrument and performs the steps, at least partially, of the method according to the invention.

Although the invention is illustrated above, partly with reference to some preferred embodiments, it must be understood that numerous modifications and combinations of different features of the embodiments can be made. All of these modifications lie within the scope of the appended claims.

What is claimed is:

1. A method for registering two or more three-dimensional (3D) point clouds, the method comprising:
   with a surveying instrument, obtaining a first 3D point cloud of a first setting at a first position;
   initiating a first Simultaneous Localization and Mapping (SLAM) process by capturing first initial image data at the first position with a camera unit of the surveying instrument, and wherein the first initial image data and the first 3D point cloud share a first overlap, and wherein the first SLAM process comprises:
      spatially linking the first 3D point cloud with the first initial image data based on the first overlap,
      moving the surveying instrument along a first path from the first position to a second position, and
      whilst moving, continuously capturing first image data of a first SLAM setting, wherein the first image data are a first sequence of image data comprising the first initial image data,
   finalizing the first SLAM process at the second position by capturing first final image data with the camera unit, wherein the first final image data comprises the first image data;
   with the surveying instrument, obtaining a second 3D point cloud of a second setting at the second position;
   based on the first SLAM process, registering the first 3D point cloud and the second 3D point cloud relative to each other, and
   merging the first 3D point cloud and the second 3D point cloud to a total point cloud within a single coordinate system, wherein the merging is performed according to a global optimization that jointly minimizes at least one of 2D-to-2D distances, 2D-to-3D distances and 3D-3D distances between 3D points and/or 2D reprojections.

2. The method according to claim 1, wherein the first SLAM process further comprises:
   whilst moving, continuously building a first SLAM point cloud representing the first SLAM setting.

3. The method according to claim 2, further comprising:
   merging the first 3D point cloud, the first SLAM point cloud and the second 3D point cloud to the total point cloud within the single coordinate system.

4. The method according to claim 1, further comprising:
   spatially linking the second 3D point cloud with the first final image data based on a second overlap, which second overlap is shared by the first final image data and the second 3D point cloud.

5. The method according to claim 1, wherein the first SLAM process further comprises:
   during feature tracking, transforming feature appearance based on at least one of:
      intrinsic camera parameters, in particular camera lens distortions,
      extrinsic camera parameters, in particular camera perspective distortions, and
      camera unit displacement measured by using additional sensory input.

6. The method according to claim 1, wherein the first SLAM process further comprises:
   processing the first image data of the first SLAM process such that they are represented in a locally angle-preserving format.

7. The method according to claim 1, further comprising:
   at a third position, initiating a second SLAM process by capturing second initial image data with the camera unit, wherein the second initial image data share a third overlap with the first SLAM setting, and wherein the second SLAM process comprises:
      spatially linking the total point cloud with the second initial image data based on the third overlap,
      moving the surveying instrument along a second path from the third position to a fourth position,
      whilst moving, continuously capturing second image data of a second SLAM setting, wherein the second image data are a second sequence of image data comprising the second initial image data,
      building a second SLAM point cloud representing a second SLAM setting,
      finalizing the second SLAM process at the fourth position by capturing second final image data with the surveying instrument,
   with the surveying instrument, obtaining a third 3D point cloud of a third setting at the fourth position, and based on the second SLAM process, registering the third 3D point cloud and the total point cloud relative to each other.

8. The method according to claim 7, further comprising:
   at a fifth position, capturing third image data with the camera unit or an external camera, wherein the third image data at least in part share a fourth overlap with at least one of the SLAM settings,
   identifying points of corresponding features in the third image data and one or more of the image data of the SLAM processes, and
   by an image based reconstruction, extending at least one of the SLAM point clouds and the total point cloud based on the third image data.

9. A method for registering two or more three-dimensional (3D) point clouds, the method comprising:
   with a surveying instrument, obtaining a first 3D point cloud of a first setting at a first position;
   initiating a first Simultaneous Localization and Mapping (SLAM) process by capturing first initial image data at the first position with a camera unit of the surveying instrument, and wherein the first initial image data and the first 3D point cloud share a first overlap, and wherein the first SLAM process comprises:
      spatially linking the first 3D point cloud with the first initial image data based on the first overlap,
      moving the surveying instrument along a first path from the first position to a second position, and
      whilst moving, continuously capturing first image data of a first SLAM setting, wherein the first image data are a first sequence of image data comprising the first initial image data,
   finalizing the first SLAM process at the second position by capturing first final image data with the camera unit, wherein the first final image data comprises the first image data;
   with the surveying instrument, obtaining a second 3D point cloud of a second setting at the second position; and
   based on the first SLAM process, registering the first 3D point cloud and the second 3D point cloud relative to each other, wherein the registering is performed further based on a global optimization, wherein the global optimization comprises a bundle-adjustment (BA) that jointly minimizes:

2D-to-2D distances between 2D reprojections of the first image data, and at least one of:
  2D-to-3D distances between 2D reprojections of the first initial image data and 3D points of the first 3D point cloud, and
  2D-to-3D distances between 2D reprojections of the first final image data and 3D points of the second 3D point cloud.

10. The method according to claim 9, wherein the first SLAM process further comprises:
  whilst moving, continuously building a first SLAM point cloud representing the first SLAM setting; and
  merging the first 3D point cloud, the first SLAM point cloud and the second 3D point cloud to the total point cloud within the single coordinate system.

11. A method for registering two or more three-dimensional (3D) point clouds, the method comprising:
  with a surveying instrument, obtaining a first 3D point cloud of a first setting at a first position;
  initiating a first Simultaneous Localization and Mapping (SLAM) process by capturing first initial image data at the first position with a camera unit of the surveying instrument, and wherein the first initial image data and the first 3D point cloud share a first overlap, and wherein the first SLAM process comprises:
    spatially linking the first 3D point cloud with the first initial image data based on the first overlap,
    moving the surveying instrument along a first path from the first position to a second position, and
    whilst moving, continuously capturing first image data of a first SLAM setting, wherein the first image data are a first sequence of image data comprising the first initial image data,
  finalizing the first SLAM process at the second position by capturing first final image data with the camera unit, wherein the first final image data comprises the first image data;
  with the surveying instrument, obtaining a second 3D point cloud of a second setting at the second position;
  based on the first SLAM process, registering the first 3D point cloud and the second 3D point cloud relative to each other, wherein the registering is performed further based on a global optimization, wherein the global optimization comprises an iterative-closest-point (ICP) optimization that minimizes 3D-to-3D distances between at least two of:
  3D points of the first 3D point cloud;
  3D points of the second 3D point cloud; and
  3D points of the first SLAM point cloud.

12. The method according to claim 11, wherein the first SLAM process further comprises:
  whilst moving, continuously building a first SLAM point cloud representing the first SLAM setting; and
  merging the first 3D point cloud, the first SLAM point cloud and the second 3D point cloud to the total point cloud within the single coordinate system.

13. A method for registering two or more three-dimensional (3D) point clouds, the method comprising:
  with a surveying instrument, obtaining a first 3D point cloud of a first setting at a first position;
  initiating a first Simultaneous Localization and Mapping (SLAM) process by capturing first initial image data at the first position with a camera unit of the surveying instrument, and wherein the first initial image data and the first 3D point cloud share a first overlap, and wherein the first SLAM process comprises:
    spatially linking the first 3D point cloud with the first initial image data based on the first overlap,
    moving the surveying instrument along a first path from the first position to a second position, and
    whilst moving, continuously capturing first image data of a first SLAM setting, wherein the first image data are a first sequence of image data comprising the first initial image data,
  finalizing the first SLAM process at the second position by capturing first final image data with the camera unit, wherein the first final image data comprises the first image data;
  with the surveying instrument, obtaining a second 3D point cloud of a second setting at the second position;
  based on the first SLAM process, registering the first 3D point cloud and the second 3D point cloud relative to each other, wherein the first SLAM process further comprises:
  during feature tracking, transforming feature appearance based on at least one of:
    intrinsic camera parameters, in particular camera lens distortions,
    extrinsic camera parameters, in particular camera perspective distortions, and
    camera unit displacement measured by using additional sensory input.

14. The method according to claim 13, wherein the first SLAM process further comprises:
  whilst moving, continuously building a first SLAM point cloud representing the first SLAM setting; and
  merging the first 3D point cloud, the first SLAM point cloud and the second 3D point cloud to the total point cloud within the single coordinate system.

* * * * *